US010705517B1

(12) United States Patent
Dresang et al.

(10) Patent No.: US 10,705,517 B1
(45) Date of Patent: Jul. 7, 2020

(54) EQUIPMENT MONITORING SYSTEM

(71) Applicants: Richard D. Dresang, Hartford, WI (US); Roger W. Schreiber, Fremont, WI (US); Daniel M. Olson, Mequon, WI (US); Christopher J. Brimmer, Janesville, WI (US); Bernard M. Hengels, Neenah, WI (US)

(72) Inventors: Richard D. Dresang, Hartford, WI (US); Roger W. Schreiber, Fremont, WI (US); Daniel M. Olson, Mequon, WI (US); Christopher J. Brimmer, Janesville, WI (US); Bernard M. Hengels, Neenah, WI (US)

(73) Assignee: UEMSI/HTV, INC., Jackson, WI (US)

( * ) Notice: Subject to any disclaimer, the term of this patent is extended or adjusted under 35 U.S.C. 154(b) by 0 days.

(21) Appl. No.: 16/198,805

(22) Filed: Nov. 22, 2018

Related U.S. Application Data

(63) Continuation-in-part of application No. 15/219,740, filed on Jul. 26, 2016, now abandoned.

(51) Int. Cl.
*G05B 23/02* (2006.01)
*F01M 11/10* (2006.01)
*F16C 19/52* (2006.01)
*E03F 7/10* (2006.01)
*H04W 4/38* (2018.01)

(52) U.S. Cl.
CPC .............. *G05B 23/027* (2013.01); *E03F 7/10* (2013.01); *F01M 11/10* (2013.01); *F16C 19/527* (2013.01); *H04W 4/38* (2018.02); *F01M 2011/146* (2013.01); *F01M 2011/1473* (2013.01)

(58) Field of Classification Search
CPC ...... G05B 23/027; F04B 23/08; F04B 49/065; H04L 67/12
See application file for complete search history.

(56) References Cited

U.S. PATENT DOCUMENTS

| 4,186,562 | A  | * | 2/1980  | Tyree, Jr.    | F25D 3/10 62/165 |
| 6,422,822 | B1 | * | 7/2002  | Holmes        | F04D 13/083 417/13 |
| 6,617,968 | B1 | * | 9/2003  | Odisho        | F16N 29/00 340/438 |
| 7,283,914 | B2 |   | 10/2007 | Poorman et al.|                  |

(Continued)

*Primary Examiner* — Kidest Bahta
(74) *Attorney, Agent, or Firm* — Donald J. Ersler

(57) ABSTRACT

An equipment monitoring system preferably includes an electronic control device, a controller area network bus wiring harness (CAN BUS) and a plurality of sensors. The electronic control device preferably includes a software program for receiving input from the plurality of sensors. The CAN BUS wiring harness provides an interface between the electronic control device and the plurality of sensors. The plurality of sensors include at least one oil temperature sensor, at least one fluid pressure sensor, at least one vibration sensor, at least one speed sensor, a moisture sensor vacuum sensor and an exhaust air temperature sensor. The software program monitors the plurality of sensors. If the operating limit of one of the plurality of sensors is exceeded, the electronic control device sets off some type of alarm. The electronic control device preferably wirelessly transmits the data received from the sensor to a remote device.

9 Claims, 2 Drawing Sheets

(56) References Cited

U.S. PATENT DOCUMENTS

| | | | |
|---|---|---|---|
| 8,903,593 B1* | 12/2014 | Addepalli | H04W 72/0406 701/29.1 |
| 9,015,059 B2 | 4/2015 | Sims, III et al. | |
| 2004/0199831 A1 | 10/2004 | Shibata et al. | |
| 2007/0178346 A1* | 8/2007 | Kiya | H01M 10/486 429/432 |
| 2008/0316856 A1* | 12/2008 | Cooley | B28C 5/4275 366/142 |
| 2009/0240427 A1* | 9/2009 | Siereveld | G01C 21/3469 701/533 |
| 2009/0250125 A1* | 10/2009 | Howitt | G01M 3/243 137/551 |
| 2009/0306839 A1 | 12/2009 | Youngquist et al. | |
| 2010/0230901 A1* | 9/2010 | Brooks | F16J 15/43 277/317 |
| 2012/0043726 A1* | 2/2012 | Zubia | E21B 33/085 277/322 |
| 2013/0191066 A1* | 7/2013 | Spillane | H02G 1/02 702/135 |
| 2013/0283898 A1* | 10/2013 | Rollinger | G01M 3/26 73/114.77 |
| 2014/0316594 A1* | 10/2014 | Steele | G05B 9/02 700/291 |

* cited by examiner

US 10,705,517 B1

EQUIPMENT MONITORING SYSTEM

CROSS-REFERENCES TO RELATED APPLICATIONS

This continuation in part patent application takes priority from patent application Ser. No. 15/219,740, filed on Jul. 26, 2016.

BACKGROUND OF THE INVENTION

1. Field of the Invention

The present invention relates generally to equipment maintenance and more specifically to an equipment monitoring system, which will send a message to a remote device when a parameter condition of a piece of equipment exceeds predetermined limits.

2. Discussion of the Prior Art

There are numerous systems for monitoring parameter conditions of a piece of equipment. Patent publication no. 2004/0199831 to Shibata et al. discloses a work machine maintenance system. U.S. Pat. No. 7,283,914 to Poorman et al. discloses a system and method for vibration monitoring. Patent publication no. 2009/0306839 to Youngquist et al. discloses aircraft monitoring equipment. U.S. Pat. No. 9,015,059 to Sims, III et al. discloses a wireless system for automatic ordering of maintenance parts for equipment. However, it appears none of the prior art discloses monitoring condensation in oil inside an engine crank case or a gear case; vibration at multiple points on a transfer case, starter and engine block; and monitoring equipment to prevent self-destruction.

Accordingly, there is a clearly felt need in the art for an equipment monitoring system, which discloses monitoring condensation in oil inside an engine crank case or gear case; vibration at multiple points on a transfer case, starter and engine block; monitoring equipment to prevent self-destruction; and sending the information to a remote device that a parameter condition of the piece of equipment exceeds operating limits.

SUMMARY OF THE INVENTION

The present invention provides an equipment monitoring system, which will send a message to a remote device when a parameter condition of a piece of equipment exceeds operational limits. The equipment monitoring system preferably includes an electronic control device, a controller area network bus wiring harness (CAN BUS) and a plurality of sensors. The electronic control device may be a micro controller or a microprocessor. The electronic control device preferably includes a software program for receiving input from the plurality of sensors. It is preferable that the electronic control device operates on real time and receives GPS information to provide real time and location information. The CAN BUS wiring harness provides an interface between the electronic control device and the plurality of sensors. The plurality of sensors include at least one oil temperature sensor, at least one fluid pressure sensor, at least one vibration sensor, at least one speed sensor, a moisture sensor, vacuum sensor and an exhaust air temperature sensor. Operating limits are entered into the software program for each one of the plurality of sensors. The software program periodically monitors each one of the plurality of sensors. If the operating limit of one of the plurality of sensors is exceeded, the electronic control device sets off at least one of an audio, light and vibration alarm. The electronic control device preferably wirelessly transmits the data received from the sensor to a remote device through WIFI. The remote device may be instructed to set-off an audio, light or vibration alarm. The information may be scrolled across a display screen or the displayed on the remote device.

Accordingly, it is an object of the present invention to provide an equipment monitoring system, which discloses monitoring condensation in oil inside an engine crank case or gear case; vibration at multiple points on a transfer case, fan, blower, hydraulic pump, engine crank case or gear case; monitoring equipment to prevent self-destruction; and sending the information to a remote device that a parameter condition of the piece of equipment exceeds operating limits.

These and additional objects, advantages, features and benefits of the present invention will become apparent from the following specification.

DETAILED DESCRIPTION OF THE PREFERRED EMBODIMENTS

Figure 1:
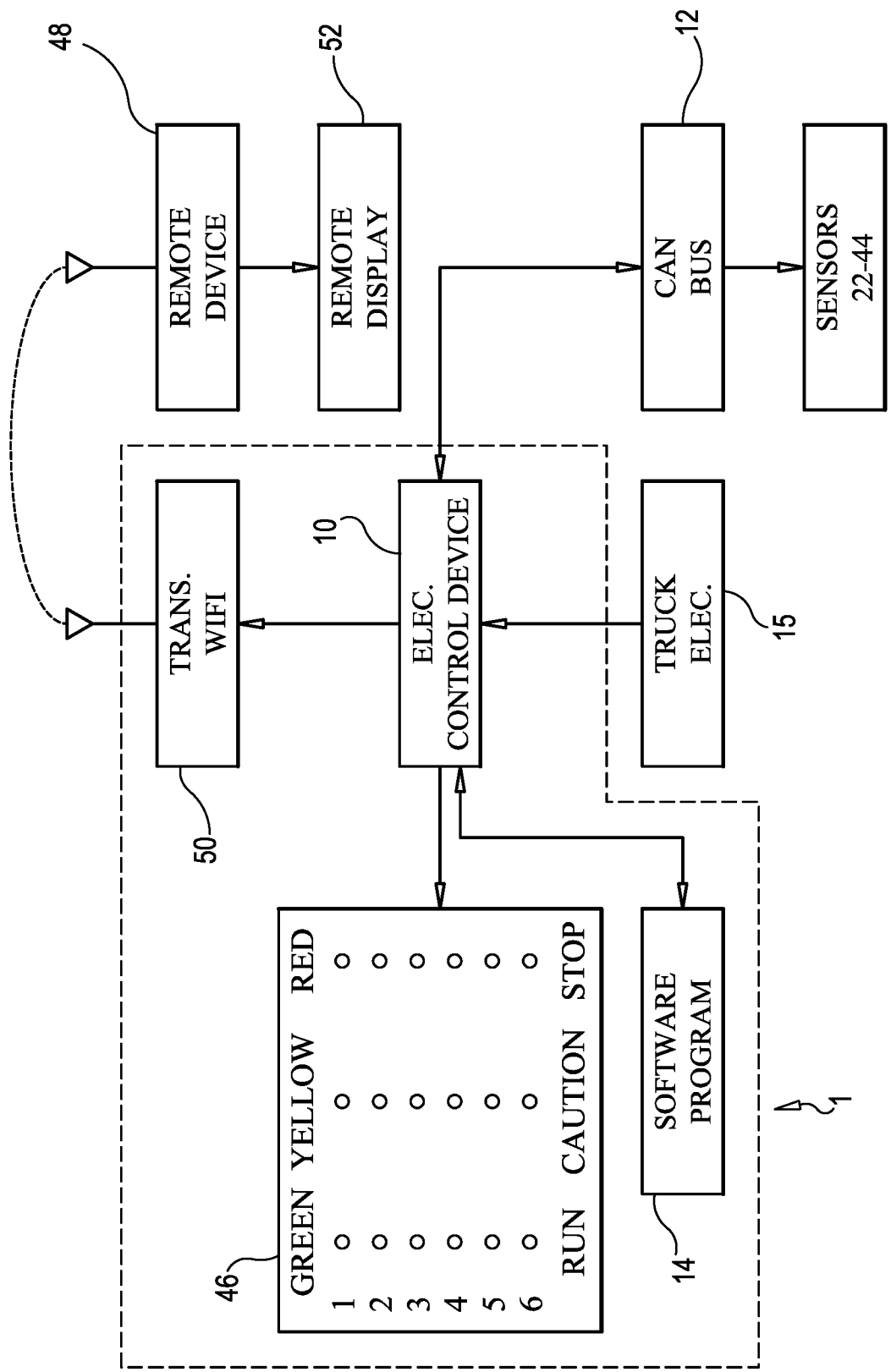
FIG. 1 is a schematic diagram of an equipment monitoring system in accordance with the present invention.
Figure 2:
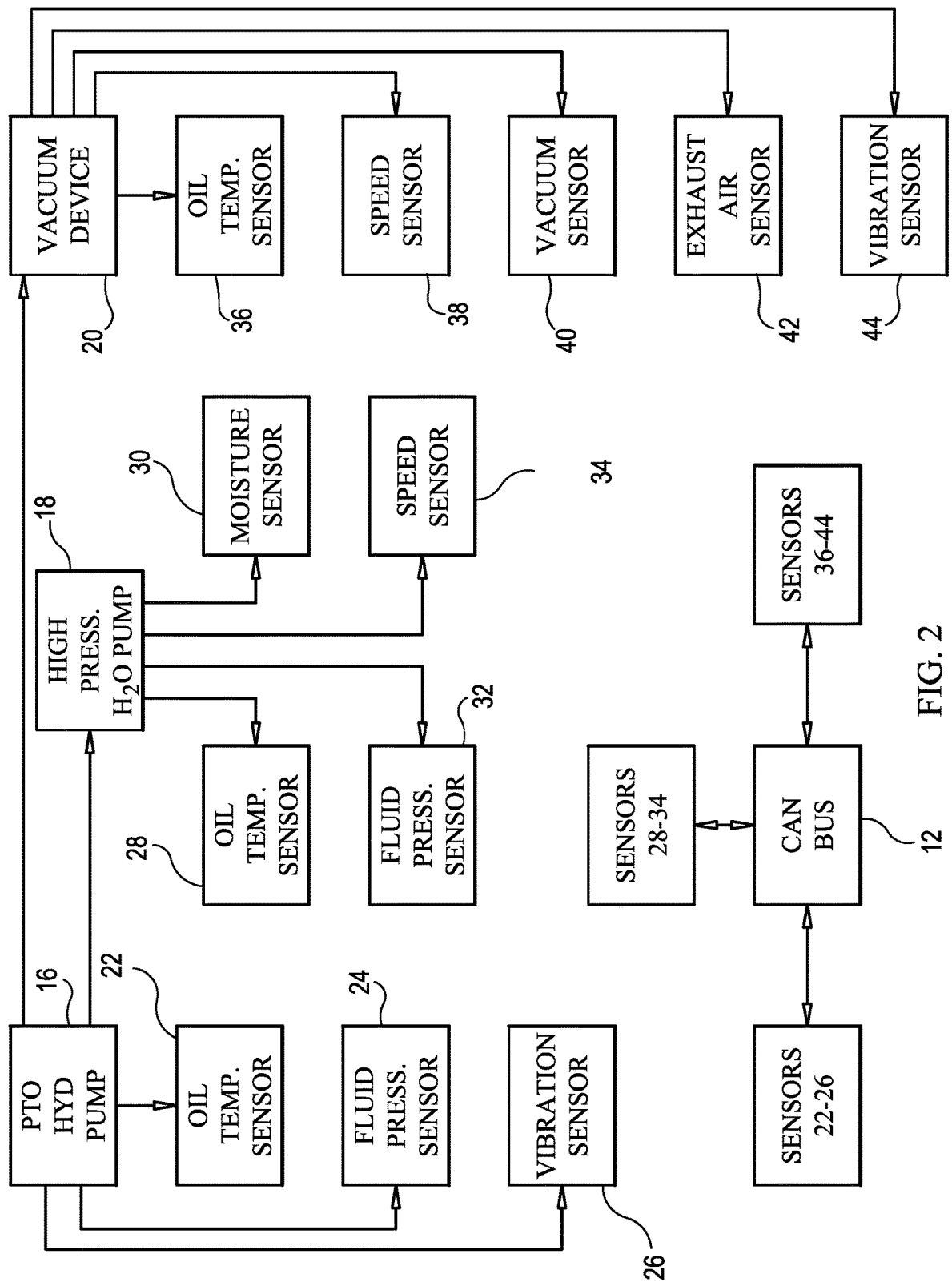
FIG. 2 is a schematic diagram of an equipment monitoring system installed on a sewer cleaning truck or a vacuum combination truck illustrating elements of the sewer cleaning truck or the vacuum combination truck with sensors connected to them in accordance with the present invention.

With reference now to the drawings, and particularly to FIG. 1, there is shown a schematic diagram of an equipment monitoring system 1. With reference to FIG. 2, the equipment monitoring system 1 preferably includes an electronic control device 10, a CAN BUS 12 and a plurality of sensors. The electronic control device 10 may be a micro controller or a microprocessor. The electronic control device 10 includes a software program 14 for receiving input from the plurality of sensors. It is preferable that the electronic control device 10 operates on real time and receives GPS information to provide real time and location information. The CAN BUS 12 provides an interface between the electronic control device 10 and the plurality of sensors. The devices being monitored can be the same type or different types of devices, and the sensors may be same type or multiple different types of sensors. The equipment monitoring system 1 can be used on many types of equipment.

The following illustration is given by way of example and not by way of limitation. A sewer cleaning truck (not shown) has numerous devices, which are subject to frequent failure. The sewer cleaning truck includes a power take-off hydraulic pump (PTO hydraulic pump) 16, a high pressure water pump 18 and a vacuum device 20. The PTO hydraulic pump 16 is driven by an engine of the sewer cleaning truck. The electronic control device 10 is preferably supplied with electrical power from an electrical system 15 of the sewer cleaning truck. The high pressure water pump 18 and the vacuum device 20 are both driven by the output of the PTO hydraulic pump 16 or an auxiliary engine. The vacuum device 20 may be a positive displacement blower or a vacuum fan. A vacuum device 20 with a positive displacement blower may have cooling issues if there is a blockage in an inlet of vacuum piping. The blockage will cause premature oil breakdown in the pumps oil cooling system, due to overheating. The oil breakdown will cause the positive blower to vibrate. Sensors for oil temperature, exhaust air temperature, and rotor bearing vibration may be used to monitor the vacuum device 20.

An oil temperature sensor 22 is used to monitor lubricating oil inside a housing of the PTO hydraulic pump 16. The oil temperature sensor 22 is not immersed in a bath of oil. An oil drain plug of the PTO hydraulic pump 16 is machined so that a probe of an oil temperature/moisture sensor can be screwed into the oil drain plug. The probe tip protrudes past an end of the oil plug into the crankcase of oil. The oil temperature/moisture sensor can measure oil temperature while detecting any water entering the crankcase through a faulty piston shaft seal of the PTO hydraulic pump 16.

Overheated oil will provide evidence of the start of a bearing failure. A fluid pressure sensor 24 monitors the output pressure of the hydraulic fluid supplied by the PTO hydraulic pump 16. A reduction in hydraulic pressure will provide evidence of the start of a bearing failure; sealing leak; restriction in the hydraulic line; and a restriction occurring in at least one of a filter and a collapsed conduit. A vibration sensor 26 is attached to an outside surface of the housing of the PTO hydraulic pump 16. The vibration sensor 26 is used to monitor the PTO hydraulic pump 16 for the start of bearing failure; fluid cavitation caused by restricted fluid flow; rotating components operating out of specification; and non-efficient equipment operation.

An oil temperature sensor 28 is used to monitor lubricating oil temperature inside a housing of the high pressure water pump 18 or a fan blower gear box. Overheated oil will provide evidence of the start of a bearing failure or a lack of lubrication. A moisture sensor 30 will provide evidence that a sealing failure has occurred, because water has entered an oil enclosure of the high pressure water pump 18 due to a shaft seal failure. A fluid pressure sensor 32 senses the pressure of water leaving the high pressure water pump 18. A decrease in water pressure provides evidence of the start of a bearing failure, or a problem with the PTO hydraulic pump 16 providing sufficient hydraulic pressure. A speed sensor 34 monitors the speed of a plunger of the high pressure water pump 18. A decrease in speed provides evidence of the start of a bearing failure; a problem with the PTO hydraulic pump 16 providing sufficient hydraulic pressure; a problem with another piece of equipment or equipment not operating efficiently.

An oil temperature sensor 36 is used to monitor lubricating oil inside a housing of the vacuum device 20. Overheated oil will provide evidence of the start of a bearing failure or a lack of lubrication. A speed sensor 38 monitors the speed of an impeller or vane of the vacuum device 20. A decrease in speed provides evidence of the start of a bearing failure; a problem with the PTO hydraulic pump 16 providing sufficient hydraulic pressure; or a fan's transmission not operating correctly. A vacuum sensor 40 allows the vacuum device to be dead-headed and tested to see if there are any leaks in the system, or to see if there is a restriction in an air passage ways as the result of matter build-up causing equipment to operate inefficiently. An exhaust air temperature sensor 42 provides evidence that matter is sticking to the impeller, restricted airflow or restrictions in air passage ways caused by matter build-up causing equipment to operate less efficiently, which all result in a temperature of the vacuum exhaust increasing. A vibration sensor 44 provides evidence that matter is sticking to the impeller and that the impeller is rotating with an imbalance.

Further, the vacuum device 20 with a positive displacement blower or a vacuum fan may have cooling issues if there is a blockage in an inlet of vacuum piping. The blockage will cause premature oil breakdown in the pumps oil cooling system, due to overheating. The oil breakdown will cause the positive blower to vibrate. The oil temperature sensor 36, the exhaust air temperature sensor 42, and rotor bearing vibration 44 may be used to monitor the vacuum device 20. The sensors are monitored multiple times during each minute for more than one type of function.

The oil temperature sensor 22, 28, 36 preferably utilizes thermocouple technology, but other suitable types of technologies may also be used. The fluid pressure sensor 24, 32 preferably utilizes a moving diaphragm technology, but other suitable types of technologies may also be used. The vibration sensor 26, 44 preferably utilizes piezo-electric or accelerometer technology, but other suitable technologies may also be used. The moisture sensor 30 preferably utilizes a capacitive hygrometer technology, but other suitable technologies may also be used. The speed sensor 34, 38 preferably utilizes an optical encoder technology, but other suitable technologies may also be used. The vacuum sensor 40 preferably utilizes moving diaphragm technology, but other suitable technologies may also be used. The exhaust air sensor preferably utilizes a resistive temperature device technology, but other suitable technologies may also be used.

Operating limits are entered into the software program 14 for each one of the plurality of sensors 22-44. The operating limits are used to prevent damage to devices or equipment. Damage will cause downtime and lead to job unprofitability. However, a major failure could cause personal injury. Operating limits are set according to the user entered operating parameters of numerous pieces of equipment. Different equipment requires the entry of different operating parameters. The operating parameters will vary between different brands of the same type of equipment. Thus the equipment monitoring system 1 has the flexibility to be tailored or optimized to individual needs of equipment by user entered operating parameters. The equipment monitoring system 1 monitors normal and non-compliant performance on multiple devices at the same time to probe each sensor 22-44 for data several times a second, recording the sensor date and messaging the user via Bluetooth, or WiFi. The operator is informed of a non-compliant reading such as overheating or bearing vibration, so the operator can determine to terminate the operation of the device or to monitor device for termination. The equipment monitoring system 1 also has the capacity to send information to another location such as a main office.

Outputs of the sensors 22-44 are connected to the CAN BUS 12, which is connected to the electronic control device 10. The software program 14 periodically monitors the sensors 22-44. If the operating limit of one of the sensors 22-44 is exceeded, the electronic control device 10 sets off at least one of an audio alarm, a light and vibration alarm through an alarm device 46. The alarm device 46 includes a plurality of red lights, yellow lights and red lights for monitoring sensors 22-44. A green light indicates that the device or equipment is running within operating limits; a yellow light indicates that the device or equipment is running near a boundary of the operating limits and should be monitored; and a red light means the device or equipment is running outside the operating limits and should be turned off to prevent damage. At least one alarm will be activated when the device or equipment runs outside the programmed operating limits.

The electronic control device 10 preferably wirelessly transmits the data received from the sensors 22-44 to a remote device 48 through a wireless transmitter 50. The wireless transmitter 50 is preferably a WIFI transmitter, but other wireless protocols may also be used. The remote device 48 may be instructed to set-off an audio, light or vibration alarm. The information may be scrolled across a display screen 52 or the displayed on the display screen 52.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of monitoring equipment used on sewer cleaning trucks or vacuum combination trucks, comprising the steps of:
   providing an electronic control device having a software program;
   providing a CAN BUS which communicates with said electronic control device; and
   connecting at least one sensor to said CAN BUS, operating limits of equipment are entered into said software program for each one of said at least of sensor, said software program monitors the outputs from said at least one sensor to ensure the output of said at least one sensor is within said operating limits, said operating limits for said at least one sensor are user entered according to a specific type of equipment and a particular brand of equipment to detect the start of a bearing failure of the equipment on the sewer cleaning trucks or vacuum combination trucks during operation of the equipment, wherein if any of said at least one sensor provides an output which is not within said operating limits, said at least one sensor is at least one of an oil temperature sensor, a fluid pressure sensor and a speed sensor, said software program provides an alarm in the form of at least one of audio, light and vibration alert.

2. The method of monitoring equipment of claim 1, further including the step of:
   providing said oil temperature sensor for measuring oil temperature inside a housing.

3. The method of monitoring equipment of claim 1, further including the step of:
   providing said fluid pressure sensor for monitoring an output pressure of hydraulic fluid used in a hydraulic driven device, a reduction in hydraulic pressure detects the bearing failure.

4. The method of monitoring equipment of claim 1, further including the step of:
   providing said at least one sensor as a vibration sensor attached to an outside surface of a housing of a piece of equipment with a bearing, said vibration sensor detects at least one of the start of a bearing failure and rotating components operating out of specification.

5. The method of monitoring equipment of claim 1, further including the step of:
   providing said speed sensor to detect a start of the bearing failure in a high pressure water pump.

6. A method of monitoring equipment on sewer cleaning trucks or vacuum combination trucks, comprising the steps of:
   providing an electronic control device having a software program;
   providing a CAN BUS which communicates with said electronic control device; and
   connecting at least one vacuum sensor to said CAN BUS, operating limits of equipment are entered into said software program for each one of said at least of vacuum sensor, said software program monitors the outputs from said at least one vacuum sensor to ensure the output of said at least one vacuum sensor is within said operating limits, said operating limits for said at least one vacuum sensor are user entered according to a specific type of equipment and a particular brand of equipment to detect any leaks in a vacuum system on the sewer cleaning trucks or vacuum combination trucks during operation of the equipment by dead-heading said vacuum system to see if there is any leak, wherein if any of said at least one vacuum sensor provides an output which is not within said operating limits, said software program provides an alarm in the form of at least one of audio, light and vibration alert.

7. The method of monitoring equipment of claim 6, further including the step of:
   testing to see if there is a restriction in an air passage ways as the result of matter build-up causing equipment to operate inefficiently.

8. A method of monitoring equipment on sewer cleaning trucks or vacuum combination trucks, comprising the steps of:
   providing an electronic control device having a software program;
   providing a CAN BUS which communicates with said electronic control device; and
   connecting at least one exhaust air temperature sensor to said CAN BUS, operating limits of equipment are entered into said software program for each one of said at least of exhaust air temperature sensor, said software program monitors the outputs from said at least one exhaust air temperature sensor to ensure the output of said at least one exhaust air temperature sensor is within said operating limits, said operating limits for said at least one exhaust air temperature sensor are user entered according to a specific type of equipment and a particular brand of equipment to measure an increase in temperature of a vacuum pump on the sewer cleaning trucks or vacuum combination trucks during operation of the equipment, wherein if any of said at least one vacuum sensor provides an output which is not within said operating limits, said software program provides an alarm in the form of at least one of audio, light and vibration alert.

9. The method of monitoring equipment of claim 8, further including the step of:
   measuring a temperature of exhaust air to determine if at least one of matter is sticking to an impeller and restrictions in air passage ways caused by matter build-up causing the vacuum pump to operate less efficiently.

\* \* \* \* \*